L. Coes,

Wrench.

No 139. Reissued June 26, 1849.

R. PETERS, PHOTO-LITHOGRAPHER, WASHINGTON, D. C.

UNITED STATES PATENT OFFICE.

LORING COES, OF WORCESTER, MASSACHUSETTS.

IMPROVEMENT IN SCREW-WRENCHES.

Specification forming part of Letters Patent No. 2,054, dated April 16, 1841; Reissue No. 139, dated June 26, 1849.

*To all whom it may concern:*

Be it known that I, LORING COES, of Worcester, in the county of Worcester and State of Massachusetts, have invented new and useful Improvements in Screw-Wrenches; and I do hereby declare that the following is a full, clear, and exact description of the principle or character which distinguishes them from all other things before known, and of the manner of making, constructing, and using the same, reference being had to the accompanying drawings, making part of this specification, in which—

Figure 1:
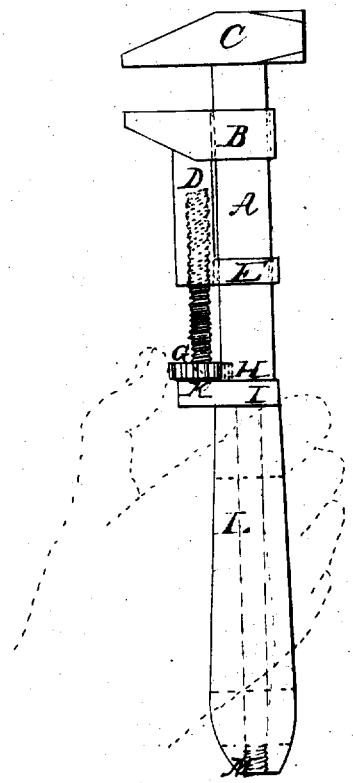
Figure 2:
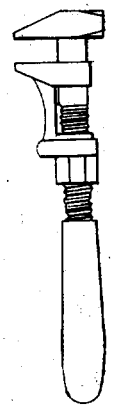

Figure 1 is an elevation of my improved wrench, and Fig. 2 an elevation of a wrench previously known but not of my invention.

In my improved wrench the inner jaw slides on the bar of the permanent jaw and handle, and is moved by a screw at the side of the bar operated by a head or rosette which always remains in the same position relatively to the handle, whereby the movable jaw can be adjusted with the thumb of the hand which grasps and holds the handle.

The principle or character of my invention, and that which distinguishes it from all other things before known, consists in moving the adjustable jaw by means of a screw placed at the side of and parallel with the bar of the permanent jaw and handle, when the required rotation for sliding the jaw is given by a rosette or head, or the equivalent thereof, which retains the same position relatively to the handle; and my invention also consists in retaining the required position of the rosette or its equivalent by which the required motion is given to the sliding jaw by having its periphery to work in a notch or recess in the bar of the permanent jaw and handle, or vice versa.

In the accompanying drawings, A represents a quadrangular bar of metal with a permanent or hammer jaw, C, at one end, the other end being reduced in size to pass through a handle, L, secured to it by a nut, M. Between the ferrule of the handle and the shoulder of the bar an iron plate, I, is gripped by the securing of the handle onto the bar, and this plate extends out sufficiently beyond the bar to receive the journal K (see dotted lines) of a screw, F, which is placed parallel with and by the side of the bar. This screw is tapped into a tubular piece, D, that projects from the back face of the adjustable jaw B, which is fitted to slide on the bar from or toward the permanent jaw C, the rear end of the tubular projection D being provided with and sustained by a bridle, E, which embraces and slides on the bar. At the rear end the screw is provided with a head or rosette, G, the periphery of which turns in a notch or recess, H, made in the edge of the bar, as shown by dotted lines, by which the position of the said rosette is retained relatively to the handle.

The hand represented by dotted lines indicates the manner in which my improved wrench is operated. The handle is grasped by the fingers, and the rosette is operated by the thumb of the same hand, so that without any change in the position of the hand the movable jaw can be moved toward or from the permanent jaw, to set the wrench to any size required, with one hand.

By means of my improvement the bar can be made of any desired form best adapted to the sliding jaw and to strength, and the rosette or its equivalent employed for operating the jaw is always retained in the same position relatively to the hand that grips the handle. At the same time the use of two bearings for the screw is avoided.

The advantages of my improved wrench over other methods of construction will be seen by comparison with the wrench represented by Fig. 2 of the accompanying drawings.

What I claim as my invention, and desire to secure by Letters Patent, is—

1. Moving the sliding jaw by a screw combined with and placed by the side of and parallel with the bar of the permanent jaw and handle, substantially as described, when the required rotation for sliding the jaw is given by the head or rosette or its equivalent, which retains the same position relatively to the handle during the operation, substantially as described.

2. Moving the sliding jaw by a screw combined with and placed by the side of and parallel with the bar of the permanent jaw and handle, substantially as described, in combination with the rosette or its equivalent, retained in its position relatively to the hand in the manner described.

Witnesses:

ISAAC DAVIS,
JONATHAN DAY,
J. S. WOODWORTH.

LORING COES.